United States Patent [19]
Rozinsky

[11] Patent Number: 5,375,813
[45] Date of Patent: Dec. 27, 1994

[54] SOFT SEAT VALVE

[76] Inventor: Carl Rozinsky, 13558-C via Flora, Delray Beach, Fla. 33484

[21] Appl. No.: 219,091

[22] Filed: Mar. 29, 1994

[51] Int. Cl.⁵ .................................................. F16K 1/44
[52] U.S. Cl. .................................... 251/333; 251/360; 251/364
[58] Field of Search ................. 251/333, 360, 364, 334

[56] References Cited
U.S. PATENT DOCUMENTS 2,920,861  1/1960  Hartmann ..................... 251/360 X
3,347,518  10/1967  Curran ............................. 251/333
3,945,390  3/1976  Huber ............................. 251/333 X Primary Examiner—Arnold Rosenthal
Attorney, Agent, or Firm—Chilton, Alix & Van Kirk

[57] ABSTRACT

A valve having a valve body, a valve plug and a deformable valve seat. A generally annular, wedge-shaped space is provided between a portion of the valve seat and a seat support in the valve body. Closing the valve brings the valve plug into single line contact with the deformable seat. Continued closing creates a myriad of line contacts as the seat deforms into the wedge shaped space, occluding any foreign surface particles and bridging surface discontinuities.

11 Claims, 2 Drawing Sheets

SOFT SEAT VALVE

BACKGROUND OF THE INVENTION

The present invention relates to fluid flow control devices. More particularly, this invention is directed to valves having resilient deformable seats.

It has long been recognized in valve construction that interposing a resilient deformable member between the valve seat and movable valve member results in an efficient seal. The reasons for this are many. First, the cooperating components, which are customarily metal members, can not be so precisely formed as to provide perfectly matched seating surfaces. A deformable member has the capability of accommodating irregularities in the seating surfaces. Second, corrosion and flow induced wear create surface imperfections in the seating surfaces. Resilient members compensate for this deterioration, extending the service life of the valve. Also, foreign particles may adhere to the seating surfaces. Such particles serve to hold or prop, i.e., crack, open the valve. The deformable members can often absorb the foreign particles allowing leak proof closure. Finally, resilient deformable valve seats are designed to be replaceable components thereby facilitating valve repair when necessary.

The conventional valve designs which utilize a resilient seat member rely upon a single line of contact between the seat and movable valve member, i.e. the plug, to establish a seal when the valve is in the closed state. Although compression of the resilient seat member may widen the contact line, the area of contact may nevertheless be insufficient to bridge large surface crevices or absorb large foreign particles. Additionally, operating conditions such as high compression, extremes in operating temperature or exposure to certain fluid mediums may cause the resilient member to adhere to the valve member and resist separation therefrom. Ultimate separation, i.e., sliding out of the valve seat and/or plug, can cause scratches in the resiliant member which can lead to failure.

A previous approach to overcoming the above-discussed operating problems employed a "floating" seat member and is shown in U.S. Pat. No. 3,598,145. While the use of a floating seat comprised of a material having a low coefficient of friction has provided an exceptionally reliable valve, failures have nevertheless occured under unusual and exceptionally harsh operating conditions. This was particularly true in high pressure applications with dirty fluids.

Another prior art approach to enhancing valve integrity is depicted in U.S. Pat. No. 3,809,362. The seats of valves of the type as depicted in U.S. Pat. No. 3,809,362 have typically had a region where the seat was subjected to bending about an edge on a supporting metal member. The stresses in this bending region have led to premature failure, particularly when the valve was subjected to extremes in temperature.

SUMMARY OF THE INVENTION

The present invention overcomes the above briefly discussed and other deficiencies and disadvantages of the prior art by providing a valve having a novel deformable seat which, while having an exceptionally long service life, may be easily replaced.

A valve in accordance with the present invention comprises a valve body, a movable valve member or plug and a deformable valve seat supported in the valve body. The valve body defines a fluid passageway which includes an aperture in a web member. This aperture has a double profile which includes a frustoconical portion and a coaxial cylindrical bore. The cylindrical bore extends from the smaller diameter end of the frustoconical portion. In a preferred embodiment this cylindrical bore is, at least in part, internally threaded. The deformable valve seat has a central axial bore, coaxial with the aperture in the web member, which is defined by a conical upper seat and a lower sleeve-like conduit. The valve seat is mechanically coupled to the web member in such a manner that the conduit portion of the seat is disposed in the cylindrical bore portion of the aperture in the web member. The conduit portion of the seat extends partially into the frustoconical portion of the valve body passageway, thereby providing a gap between the seat support surface of the web member and the smaller diameter end of the conical portion of the deformable seat. The conical portion of the deformable seat forms an angle with the axis of the aperture in the web member that is greater than the angle formed between the frustoconical seat supporting surface of the web member and the axis of the aperture. Accordingly, the aforementioned gap narrows towards the web member at the larger diameter end of the frustoconical portion of the flow passage surface. The seat is thus in permanent, albeit slidable, contact with the web member at the larger diameter end of the frustoconical aperture in the web member. The deformable valve seat is preferably comprised of a self-lubricating plastic material.

As the valve closes, the valve plug will make contact with the deformable seat along a single line contact. As valve closing continues, multiple linear contacts are created as the seat deforms into the gap. Such contacts occlude any foreign particles. The multiplicity of contacts allows the valve seat to bridge large surface discontinuities. A valve in accordance with the present invention achieves an efficient and reliable seal over a broader range of conditions and for a longer lifetime than prior art valves suitable for the same uses.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENT

Figure 1:
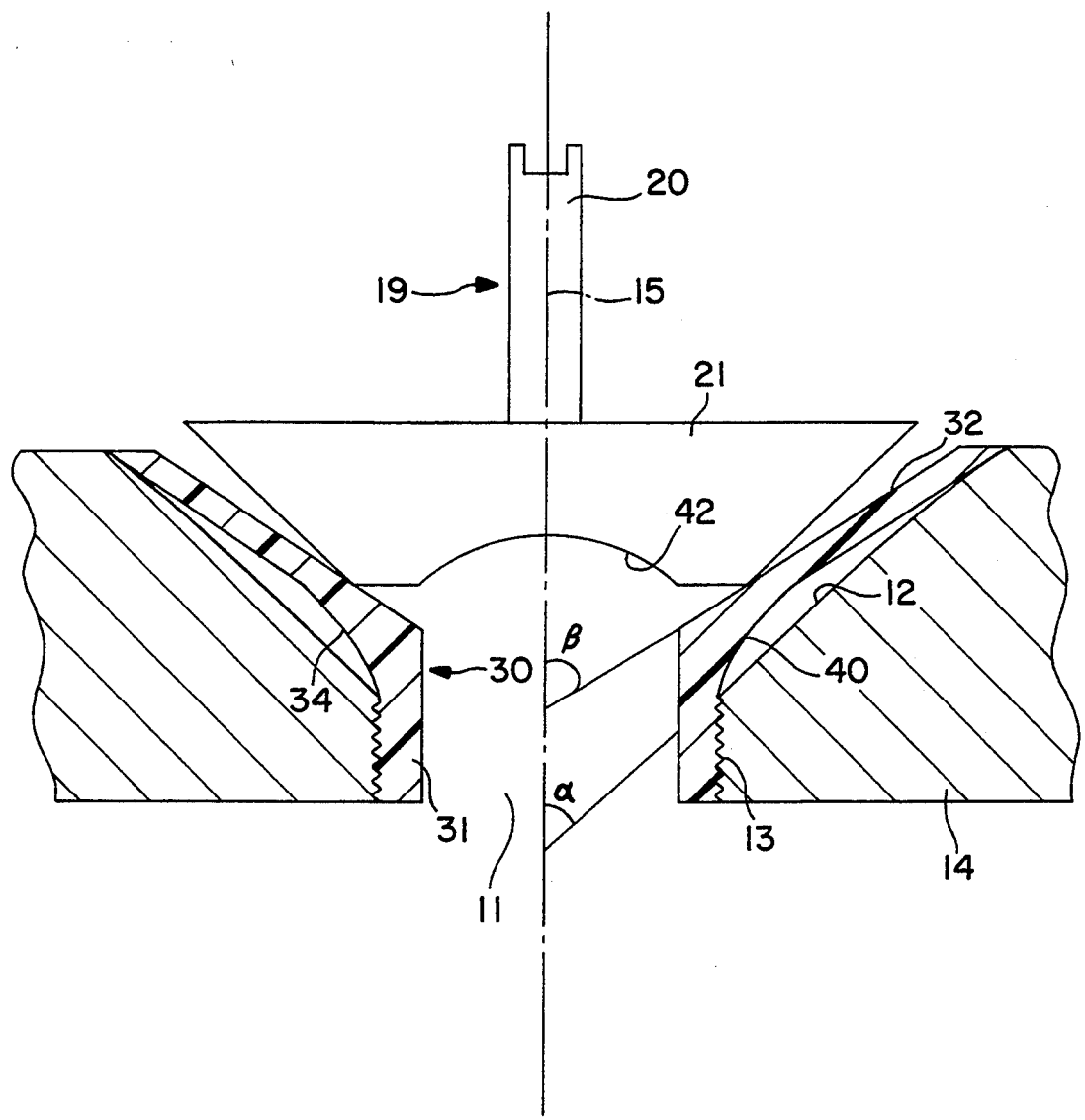
FIG. 1 is a partial vertical section of a valve in accordance with the present invention with the valve member shown in initial contact with the resiliant seat.
Figure 2:
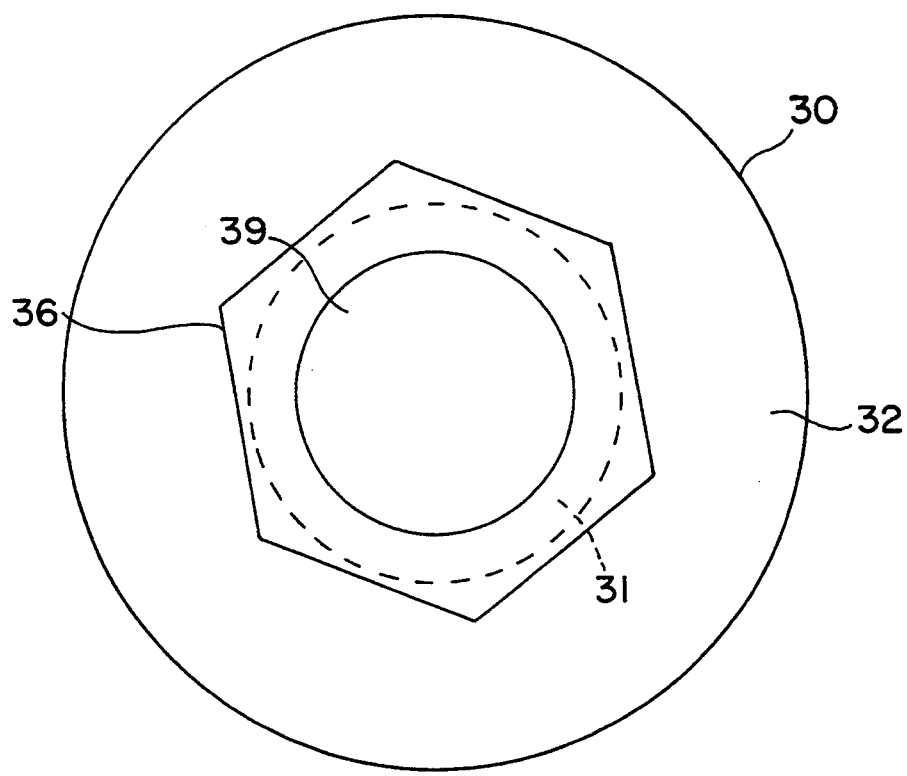
FIG. 2 is a top view of the seat of the valve of FIG. 1.

In accordance with the invention, a valve body (not shown) defines a fluid flow passage 11. Passage 11, in part, comprises a frustoconical seat support surface 12 and a cylindrical threaded bore 13 formed in a web member 14 which is integral with the valve body. The seat support surface 12 forms an angle $\alpha$ with the axis 15 of bore 13. The valve body receives a flow control member indicated generally at 19. In the disclosed embodiment member 19 comprises a valve stem 20 having a valve plug 21 connected thereto. The flow control member cooperates with a valve seat 30 to control flow through the flow passage 11. As is well understood in the art, and as will be discussed in more detail below, the shape of valve plug and the method of controlling the position and movement thereof will be dictated by the end use and may be any means suitable for the operating environment. The present invention may be used as a check-valve wherein a pressure differential in a first direction will seat the valve plug stopping flow and a pressure differential in a second direction will unseat the valve plug allowing flow.

The valve seat 30 in accordance with the invention consists generally of a deformable member having a central bore defined by a lower sleeve-like conduit 31 and an integral upper frustoconical seat portion 32. In the disclosed embodiment, the exterior surface of the conduit 31 is provided with a thread which is complementary to the thread provided on bore 13 whereby the valve seat 30 is mechanically coupled to the valve body. The seat portion 32 forms an angle $\beta$ with valve bore axis 15. Conduit 31 has a length which is longer than that of the threaded bore 13 and angle $\beta$ is greater than angle $\alpha$ whereby a gap 34 is provided between the valve seat 30 and the valve body seat support surface 12. The valve seat 30 may, for example, be formed of a self-lubricating polymeric material such as carbon-filled or glass filled polytetrafluorethylene (PTFE). Material thickness and the angles $\alpha$ and $\beta$ will vary depending on hardness/brittleness factor of the material selected. The seat 32 will preferably have an irregular shaped recess 36, or a plurality of indentations, on its upper surface which may be engaged by an appropriate hand tool during installation and removal of the seat.

The exterior of the seat 30, i.e., the side facing the web member, is desirably provided with a rounded contour, as indicated at 40, at the junction between conduit 31 and seat portion 32. This rounded contour minimizes stresses and prolongs seat life. A rounded contour may also be provided on the opposite surface of seat 30 at the junction of the cylindrical and conical portions thereof.

In order to increase the surface area exposed to fluid flowing through passage 11, the lower surface of plug 21 may be provided with a recess as indicated at 42.

In accordance with the present invention, as the valve is closed the plug 21 will initially make a single line contact with the seat 32. Multiple linear contacts are subsequently created around any embedded foreign particles on the valve plug 21 as the seat 32 deforms into the gap 34 as valve closing continues. This results in reliable, zero leakage valve closing.

While a preferred embodiment has been shown and described, various modifications and substitutions may be made thereto without departing from the spirit and scope of the invention. Accordingly, it is to be understood that the present invention has been described by way of illustration and not limitation.

I claim:

1. In a valve having a frustoconically shaped plug for opening and closing the fluid flow path defined by the valve body, the improvement comprising:

a flow path defining passage in the valve body extending between a first surface and an oppositely disposed second surface within the body, said passage having a conical portion and a coaxial generally cylindrical portion said cylindrical portion extending from the smaller diameter end of said conical portion;

a deformable valve seat having a central axial bore, said bore being defined by a conical portion and an integral sleeve-like conduit portion, said conduit portion of said seat being disposed within said cylindrical portion of said passage, said conduit defining portion of said seat extending beyond said passage cylindrical portion into the area defined by said passage conical portion whereby a gap is created between said conical passage portion and said conical seat portion, closing movement of the plug resulting in engagement between the plug and seat along a single line, and further closing movement of the plug deforming said seat whereby a plurality of line contacts are formed, said conical portion of said passage forming an angle with said flow passage axis of $\alpha$ degrees, said conical seat portion forming an angle with said axis of $\beta$ degrees, angle $\beta$ being greater than angle $\alpha$ whereby said gap narrows in the direction of the body surface which defines the larger diameter end of said passage conical portion and said seat contacts the valve body about the periphery of said larger diameter end of said passage; and means for mechanically coupling said seat to the valve body.

2. The valve of claim 1 wherein said valve seat is comprised of a self-lubricating polymeric material.

3. The valve of claim 2 wherein said valve seat material is selected from the group consisting of PTFE of PTFE with a fibrous filler.

4. The valve of claim 1 wherein said valve seat further comprises means for receiving a tool for installing said valve seat.

5. A valve having a body which defines a passage therewithin for flow of fluid therethrough, the body having a seat supporting member with opposed upper and lower surfaces, the passage including an upper conical portion of said seat supporting member and a generally cylindrical lower extension of said conical portion, the valve further having a valve plug for controlling flow through said passage, the valve additionally comprising a deformable seat having a central axial bore, said bore being defined by a conical upper seat section and a lower sleeve-like conduit extension of said conical seat section, said seat section and said conduit extension being disposed within said conical portion and lower extension respectively of said supporting member and being coaxial therewith, the axial length of said conduit extension of said seat being greater than the axial length of said cylindrical lower extension of said conical portion of the passage in said seat supporting member whereby a gap is created between said conical portion and conical seat section, said conical portion of the said passage in said seat supporting member forming an angle with the axis of said portion of $\alpha$ degrees, said seat conical section forming an angle with said axis of $\beta$ degrees, angle $\beta$ being greater than angle $\alpha$ whereby said gap is eliminated at the seat supporting member upper surface, movement of the plug to stop flow through said passage resulting in the establishment of single line contact between said seat conical section and said plug, further plug movement towards said seat supporting member deforming said seat conical section whereby a plurality of line contacts are formed.

6. The valve of claim 5 wherein said generally cylindrical extension of said conical portion of said passage on said seat supporting member has a threaded surface whereby said seat is threadably captured in said supporting member.

7. The valve of claim 5 wherein said valve seat is comprised of self-lubricating polymeric material.

8. The valve of claim 7 wherein said generally cylindrical extension of said conical portion of said passage on said seat supporting member has a threaded surface whereby said valve seat is threadably captured in said supporting member.

9. The valve of claim 8 wherein said valve seat material selected from the group consisting of PTFE, glass fiber-filled PTFE and carbon fiber-filled PTFE.

10. The valve of claim 5 wherein said valve seat further comprises means for receiving a tool for installing said valve seal.

11. In a valve having a body with a web member therein, said web member having a passage therethrough for the flow of fluid, the flow passage having an axis, said passage being defined by an upper conical portion and a lower bore extension of said conical portion, said web member having upper and lower surfaces, the valve further including a valve plug connected thereto for controlling flow through the flow passage, the improvement comprising:

a seat having a central bore coaxial with the flow passage, said bore being defined by an upper seat and a lower sleeve-like conduit, said seat being disposed within said web member conical portion, said conduit being mechanically coupled to said bore extension, said seat forming an angle with the axis of said flow passage which is greater than that formed by said conical portion of said web member whereby an annular gap having a generally wedge-shaped cross-section is formed between said seat and the web conical portion at the smaller diameter ends thereof, said gap diminishing towards the web member upper surface, said seat being comprised of a self-lubricating polymeric material, wherein movement of the valve plug to interrupt flow initially results in single line contact between the plug and said seat and further movement of said plug in the flow interruption direction deforms said seat into said gap.

* * * * *